(12) United States Patent
Ma et al.

(10) Patent No.: US 7,824,102 B2
(45) Date of Patent: Nov. 2, 2010

(54) THERMOMETER QUICK LINKAGE APPARATUS AND METHOD

(75) Inventors: Xiaojian Ma, Shenzhen (CN); Peitao Chen, Shenzhen (CN)

(73) Assignee: Shenzhen Mindray Bio-Medical Electronics, Inc., Shenzhen (CN)

( * ) Notice: Subject to any disclaimer, the term of this patent is extended or adjusted under 35 U.S.C. 154(b) by 378 days.

(21) Appl. No.: 11/951,208

(22) Filed: Dec. 5, 2007

(65) Prior Publication Data

US 2008/0137710 A1 Jun. 12, 2008

(30) Foreign Application Priority Data

Dec. 9, 2006 (CN) .................. 2006 1 0157505

(51) Int. Cl.
*G01K 7/00* (2006.01)
*G01K 13/00* (2006.01)
*A61B 6/00* (2006.01)

(52) U.S. Cl. ............... 374/158; 374/163; 600/474
(58) Field of Classification Search ........... 374/163, 374/158, E1.11; 600/474
See application file for complete search history.

(56) References Cited

U.S. PATENT DOCUMENTS

| 3,832,669 | A | * | 8/1974 | Mueller et al. ............ 374/164 |
|---|---|---|---|---|
| 3,833,115 | A | * | 9/1974 | Schapker .................. 374/158 |
| 3,905,232 | A | * | 9/1975 | Knute ....................... 374/158 |
| 3,929,018 | A | * | 12/1975 | Turner ...................... 374/158 |
| 3,999,434 | A | | 12/1976 | Yen |
| 4,054,057 | A | | 10/1977 | Kluge |
| 4,166,389 | A | | 9/1979 | Montren |
| 4,588,306 | A | | 5/1986 | Burger et al. |
| RE32,210 | E | * | 7/1986 | d'Autry ................... 73/864.14 |
| 4,619,271 | A | | 10/1986 | Burger et al. |
| 4,784,158 | A | * | 11/1988 | Okimoto .................... 600/584 |

(Continued)

FOREIGN PATENT DOCUMENTS

CN 2258274 Y 7/1997

(Continued)

OTHER PUBLICATIONS

China patent application publication No. CN2625869, published Jul. 14, 2004. No English translation available.

(Continued)

*Primary Examiner*—Lisa M Caputo
*Assistant Examiner*—Jonathan Dunlap
(74) *Attorney, Agent, or Firm*—Kory D. Christensen; Stoel Rives LLP

(57) ABSTRACT

A thermometer quick linkage apparatus comprises an elastic member, a button, a probe, and a chamber having one end provided with an opening for receiving the end portion of the probe, and the other end also provided with an opening for receiving the button. Within the chamber, one end of the elastic member connects with the button, and the other end thereof connects with the probe. The elastic member is configured such that, when the button is pressed to compress the elastic member to a certain degree, the end portion of the button comes into contact with the end portion of the probe, and when the button is pressed further down, the probe is pushed away from the chamber. The apparatus is simplified in structure, and allows quick replacement of the probe jacket, and therefore is cost-efficient.

6 Claims, 5 Drawing Sheets

U.S. PATENT DOCUMENTS

| | | | | |
|---|---|---|---|---|
| 4,863,281 | A * | 9/1989 | Suszynski | 374/158 |
| 5,293,877 | A * | 3/1994 | O'Hara et al. | 374/133 |
| 5,340,215 | A * | 8/1994 | Makita et al. | 374/121 |
| 5,487,607 | A * | 1/1996 | Makita et al. | 374/158 |
| 6,186,959 | B1 * | 2/2001 | Canfield et al. | 600/559 |
| 6,210,420 | B1 * | 4/2001 | Mauze et al. | 606/182 |
| 6,367,973 | B2 * | 4/2002 | Yamaka | 374/158 |
| 6,461,037 | B1 | 10/2002 | O'Leary | |
| 6,786,636 | B1 * | 9/2004 | Huang et al. | 374/158 |
| 6,916,314 | B2 * | 7/2005 | Schneider et al. | 606/1 |
| 6,997,067 | B2 * | 2/2006 | Viot | 73/864.14 |
| 7,108,419 | B2 * | 9/2006 | Harr | 374/121 |
| 7,264,779 | B2 * | 9/2007 | Viot | 73/864.14 |
| 7,438,694 | B2 * | 10/2008 | Boozer et al. | 600/584 |
| 7,481,818 | B2 * | 1/2009 | Allen et al. | 600/583 |
| 7,572,056 | B2 * | 8/2009 | Lane et al. | 374/158 |

FOREIGN PATENT DOCUMENTS

CN      2625869 Y      7/2004

OTHER PUBLICATIONS

China patent application No. 200610157505.4, Search Report dated Aug. 8, 2007.

* cited by examiner

THERMOMETER QUICK LINKAGE APPARATUS AND METHOD

STATEMENT OF RELATED APPLICATION

The present application claims priority of the Chinese Patent Application No. 200610157505.4, entitled "Thermometer Quick Linkage Apparatus and Method", filed on Dec. 9, 2006, which is incorporated herein by reference in its entirety.

FIELD OF THE INVENTION

The present invention relates to an electronic thermometer, in particular to a linkage apparatus and method via which the probe jacket of the electronic thermometer can be quickly replaced.

BACKGROUND OF THE INVENTION

With the development of current medical technology and demand, there exists a need to detect body temperatures of a large population. As shown in FIG. 1, the existing electronic body temperature detecting device includes a temperature probe in contact with the body site to be detected, a AD conversion circuit and a microprocessor for processing the temperature data acquired by the probe, and a display being used to display the temperature value.

To avoid the possibility of infection, the temperature probe is generally provided with a disposable jacket, like the temperature detector disclosed in U.S. Pat. No. 6,270,252. In prior art, commonly, the jacket is replaced with the help of an exterior pusher, like the structure disclosed in U.S. Pat. No. 6,839,651.

However, the prior art body temperature detecting device is relatively complex, with a large number of accessories which are prone to be damaged, and are not cost-efficient.

SUMMARY OF THE INVENTION

The object of the present invention is to provide a thermometer quick linkage apparatus with a simple structure and the method thereof, via which an probe jacket can be quickly replaced contactlessly. To achieve this object, the present invention adopts the following technical solutions.

In accordance with a first aspect of the embodiment of the present invention, a thermometer quick linkage apparatus is provided, comprising: an elastic member; a button; a probe in communication with a host of the thermometer via a leading wire; and a chamber having one end provided with an opening for receiving the end portion of the probe, the other end also provided with an opening for receiving the button. Within the chamber, one end of the elastic member connects with the button, and the other end connects with the probe; and the elastic member is configured such that, when the button is pressed to compress the elastic member to a certain degree, the end portion of the button comes in contact with the end portion of the probe, and when the button is pressed further down, the probe is pushed away from the chamber.

Preferably, the elastic member is a helical spring, one end of which is connected with the button, and the other end of which is inserted onto the end portion of the probe.

Preferably, a stop member is provided on a portion of the button that is located within the chamber to prevent the button from disengaging from the chamber, and a stop member is also provided on a portion of the probe that is located within the chamber to prevent the probe from disengaging from the chamber. The stop member on the probe defines the position of the elastic member Still preferably, a neck portion is provided on the opening end of the chamber, protruding outwards for receiving the probe, and is dimensioned to be inserted onto by the probe jacket and mate snugly with the probe jacket.

Further preferably, the chamber takes a shape of a circular cylinder, an elliptical cylinder, a prism or other random shape.

Furthermore preferably, the button, the elastic member and the probe are arranged to be substantially coaxial.

In accordance with a second aspect of the embodiment of the present invention, a thermometer quick linkage apparatus is provided, comprising: an elastic member; a button, one end of which is provided with a supporting seat that protrudes perpendicularly from the button; a probe in communication with a host of the thermometer via a leading wire; and a chamber having one end provided with an opening for receiving the end portion of the probe, and having one side axially provided with a slotted hole for receiving the button, the button being slidable along the slotted hole. Within the chamber, one end of the elastic member connects with the button, and the other end connects with the probe; and the elastic member is configured such that, when the button is pushed along the slotted hole to compress the elastic member to a certain degree, the supporting seat comes in contact with the end portion of the probe, and when the button is pushed further, the probe is pushed away from the chamber.

Preferably, the elastic member is a helical spring, one end of which is connected with the supporting seat on the button, and the other end of which is inserted onto the end portion of the probe.

Preferably, a stop member is provided on the portion of the probe within the chamber to prevent the probe from disengaging from the chamber and define the position of the elastic member.

Still preferably, a neck portion is provided on the opening end of the chamber, protruding outwards for receiving the probe, and is dimensioned to be inserted onto by the probe jacket and mate snugly with the probe jacket.

Further preferably, the chamber takes a shape of a circular cylinder, an elliptical cylinder, a prism or other random shape.

Furthermore preferably, the elastic member and the probe are arranged to be substantially coaxial.

In accordance with a third aspect of the embodiment of the embodiment of the present invention, a thermometer quick linkage apparatus is provided, comprising: an elastic member; a button having one end provided with an inclined plane; a probe in communication with a host of the thermometer via a leading wire, having an inclined plane provided at a suitable position on one end of the probe to match with the inclined plane on the button; and a chamber having one end provided with an opening for receiving the end portion of the probe, and having one side provided with an opening for receiving the button. Within the chamber, one end of the elastic member connects with the other end portion of the chamber, and the other end of the elastic member connects with the probe; and the inclined plane on the button and the inclined plane on the probe are configured such that, when the button is pressed, the inclined plane on the button is caused to slide a distance relative to the inclined plane on the probe to push the probe away from the chamber.

Preferably, the elastic member is a helical spring, one end of which connects with the other end portion of the chamber, and the other end of which is inserted onto the end portion of the probe.

Preferably, a stop member is provided on a portion of the button that is located within the chamber to prevent the button from disengaging from the chamber; and a stop member is also provided on a portion of the probe that is located within the chamber to prevent the probe from disengaging from the chamber, the stop member on the probe defining the position of the elastic member.

Still preferably, a neck portion is provided on the opening end of the chamber, protruding outwards for receiving the probe, and is dimensioned to be inserted onto by the probe jacket and mate snugly with the probe jacket.

Further preferably, the chamber takes a shape of a circular cylinder, an elliptical cylinder, a prism or other random shape.

Furthermore preferably, the elastic member and the probe are arranged to be substantially coaxial.

In accordance with a fourth aspect of the embodiment of the present invention, a thermometer quick linkage method is provided, the thermometer including a button, a probe and an elastic member connected with both the button and the probe, the method comprising the steps of: compressing the elastic member connected with the button and the probe by pressing the button; and after the elastic member has been compressed to a certain degree, further pressing the button to push the probe away.

Preferably, the elastic member is configured such that when the elastic member is compressed by pressing the button, the probe remains substantially still.

By providing an internal elastic structure on the probe and taking advantage of the pushing-out action of the probe, the thermometer quick linkage apparatus in accordance with the embodiment of the present invention is simplified in structure, and allows quick replacement of the probe jacket, and therefore is cost-efficient.

DETAILED DESCRIPTION OF THE INVENTION

Figure 1:
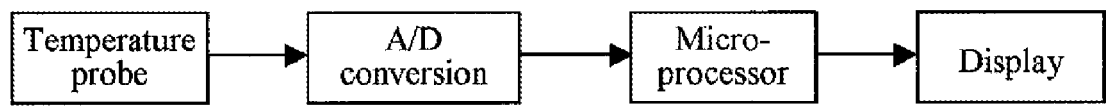
FIG. 1 shows the operating principle of a prior art electronic thermometer.
Figure 2:
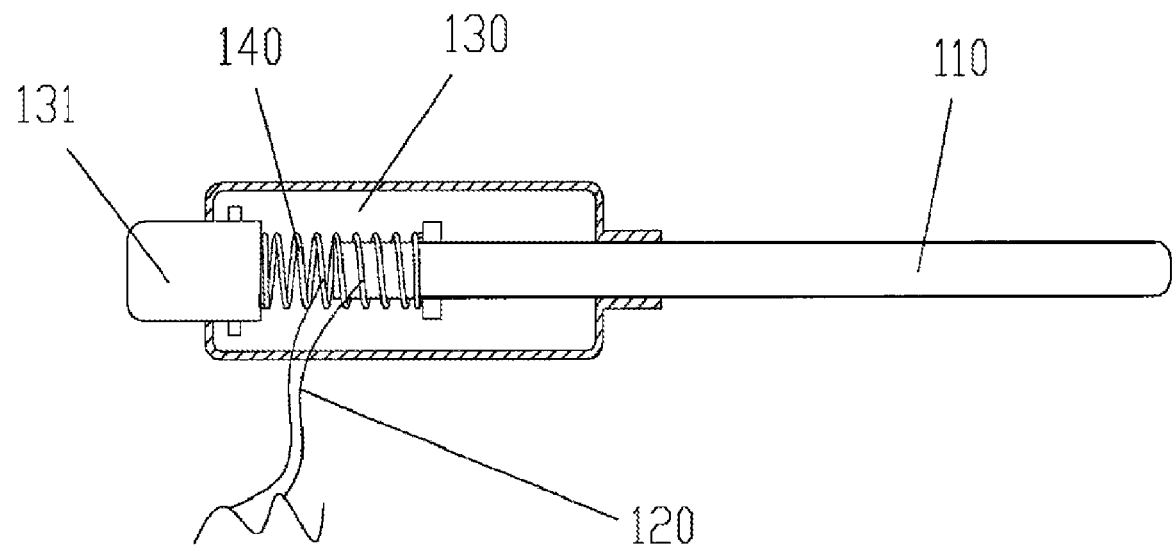
FIG. 2 is a structural schematic view of a probe in the electronic thermometer in accordance with one embodiment of the present invention.
Figure 3:
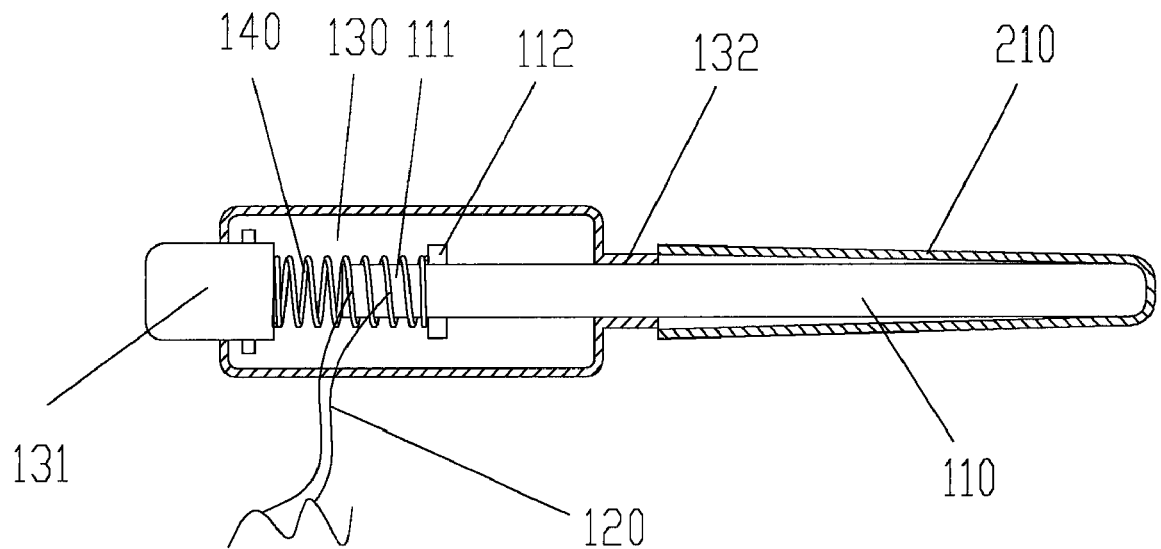
FIG. 3 is a schematic view showing the initial state of the electronic thermometer quick linkage apparatus in accordance with one embodiment of the present invention.
Figure 4:
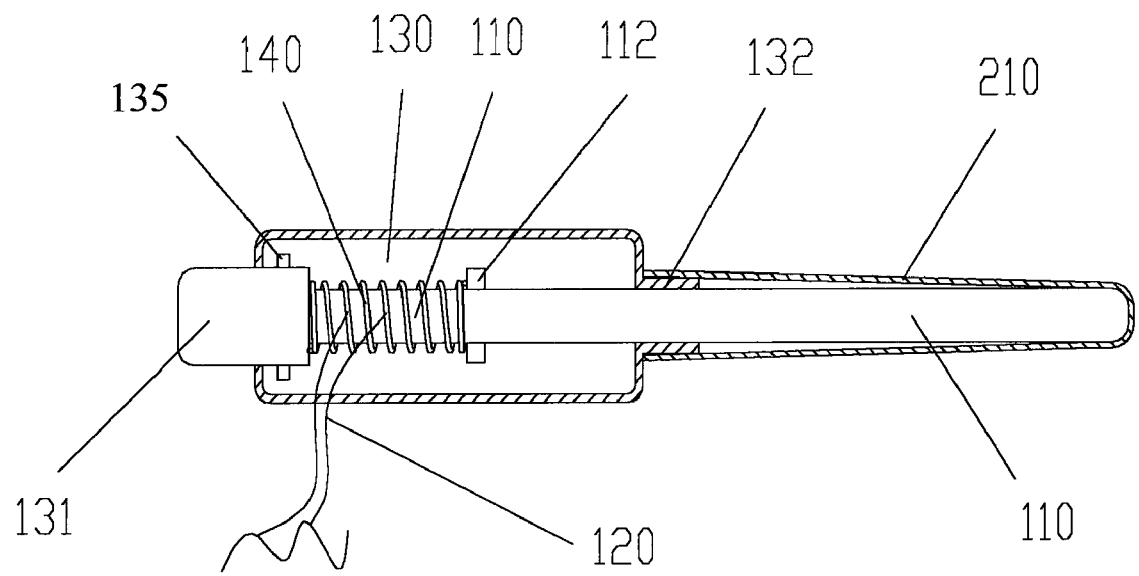
FIG. 4 is a schematic view showing a jacket assembled with the electronic thermometer quick linkage apparatus in accordance with one embodiment of the present invention.
Figure 5:
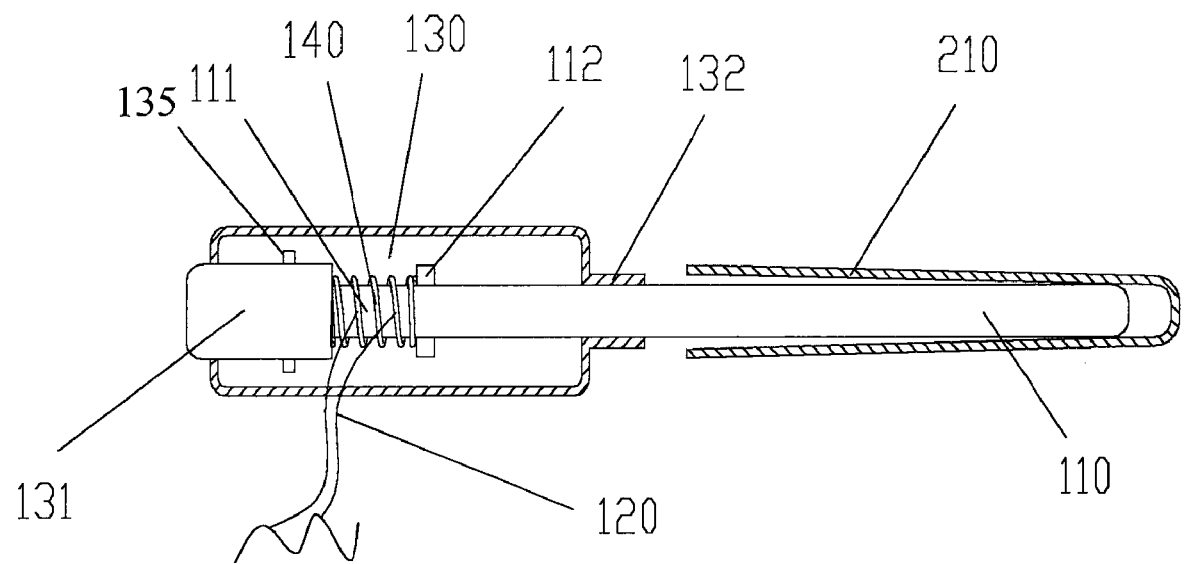
FIG. 5 is a schematic view showing a jacket disassembled from the electronic thermometer quick linkage apparatus in accordance with one embodiment of the present invention.

FIG. 2 illustrates a thermometer quick linkage apparatus in accordance with one aspect of the present embodiment, which comprises a probe 110 in communication with a host of the thermometer (not shown) via a leading wire 120 to measure the temperature through a temperature sensing circuit. To prevent cross infection during the process of temperature detection, a disposable jacket 210 is inserted onto the probe 110, as shown in FIGS. 3, 4, and 5. After one object to be tested has been measured, the jacket 210 may be replaced with another for performing the next measurement.

In the present embodiment, the probe has its rear end 111 received in a chamber 130 having a button 131 provided thereon. The chamber 130 takes a shape of a circular cylinder, an elliptical cylinder, a prism or other random shape. An elastic member 140 is arranged between the button 131 and the rear end 111. When the button 131 is not pressed down, the elastic member 140 isolates the button 131 from the probe 110 such that the button 131 does not make contact with the probe 110. The elastic member 140 may be an elastic sheet or a helical spring, preferably a helical spring in this embodiment. The two ends of the helical spring are respectively connected with the button 131 and the probe rear end 111.

In the embodiment, as shown in FIG. 3, FIGS. 4 and 5 and FIG. 6, the button 131 is provided within the rear end opening of the chamber 130, arranged substantially coaxial with the probe 110. The front end of the chamber 130 is configured such that the space between the front end and the probe body is as small as possible, and the front end loosely fits with the probe body. The probe 110 is further provided with a stop member 112 for preventing the whole probe from disengaging from the front end opening of the chamber 130. The stop member 112 may be configured into a looping ridge that protrudes from around the periphery of the probe, or configured into protrusions spaced apart from each other. The front end of the chamber 130 extends outwards to form a neck portion 132 which is dimensioned to be inserted onto by the probe jacket 210 and mate snugly with the probe jacket 210. A corresponding stop member 135 may also be provided on the button to prevent the button from falling out of the chamber.

The thermometer quick linkage apparatus according to this embodiment has a simple structure and makes use of a pushing-out action of the probe. The operating principle thereof is shown in FIGS. 3, 4, and 5. FIG. 2 shows the probe 110 prior to the measurement of a particular object using the electronic thermometer. A disposable jacket 210 is inserted onto the probe 110, as illustrated in FIG. 3. The jacket 210 is then slightly pushed such that the opening portion of the jacket 210 moves towards the chamber 130 along the probe 110 and then engages with the neck portion 132 at the front end of the chamber 130, as shown in FIG. 4. Thus, due to the clench between the jacket 210 and the neck portion 132, the elastic restoring force generated by compression of the elastic member 140 may be overcome. In this case, as the elastic member 140 is compressed, the distance between the probe and the button decreases.

When a measurement is completed and the probe jacket is to be replaced, the button 131 is pressed down to compress the elastic member 140, then the end portion of the button 131 starts to urge against the end portion of the probe 110. Further pressing down the button 131 may break the bonding between the jacket 210 and the neck portion 132 of the chamber to push the probe 110 away from the chamber. Whereby, the jacket 210 disengages from the neck portion 132 of the chamber 130, thus finishing contactless replacement of the jacket. The configuration of the thermometer quick linkage apparatus according to the present embodiment facilitates replacement of the jacket, has a simple structure and is easily operable.

Figure 7:
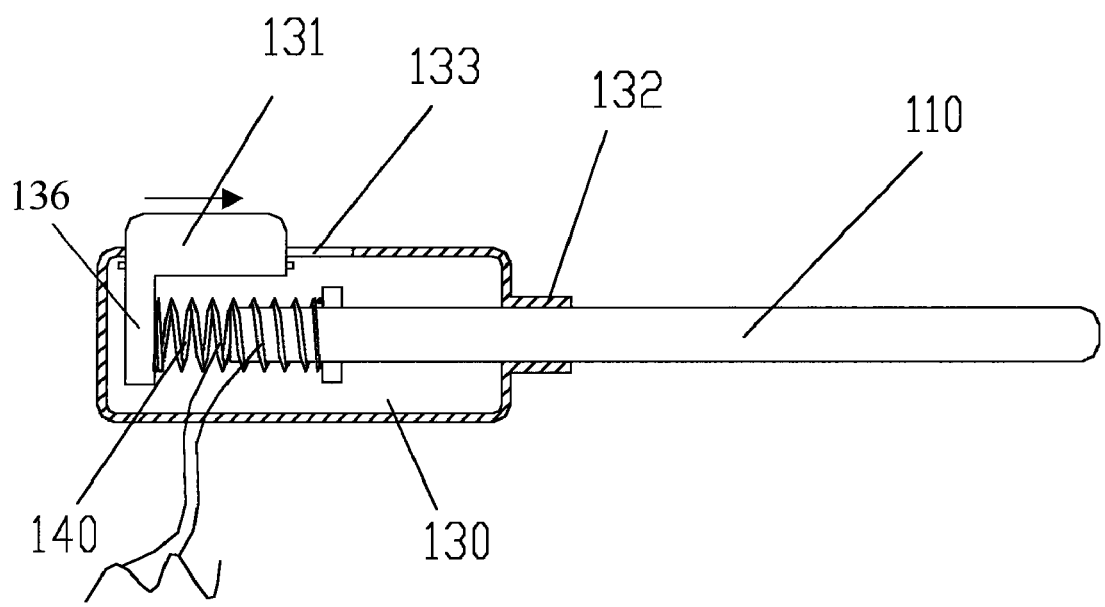
FIG. 7 is a schematic view showing the electronic thermometer quick linkage apparatus in accordance with another embodiment of the present invention.
Figure 8:
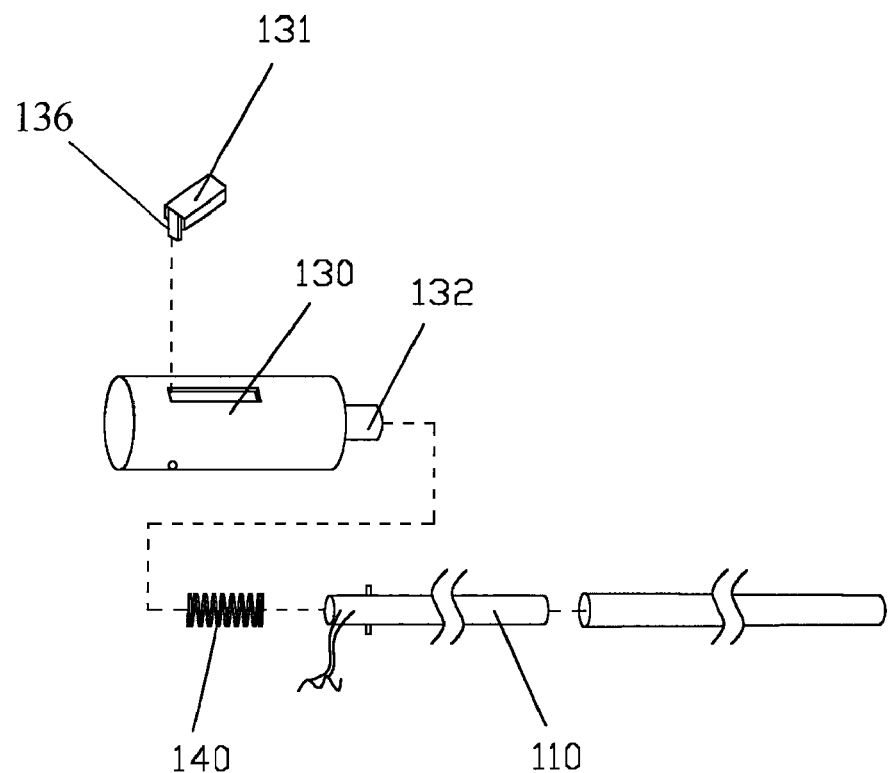
FIG. 8 is an exploded view of the electronic thermometer quick linkage apparatus in accordance with another embodiment of the present invention.

In another embodiment of the present invention, a slotted hole 133 is axially provided on one side of the chamber 130. The button 131 is received in the slotted hole 133, as shown in FIGS. 7 and 8. One end of the button 131 is provided with a supporting seat 136 that protrudes perpendicularly from the button 131. The elastic member 140 has one end connected with the supporting seat 136, and the other end inserted onto the end portion of the probe. Thus, the button 131 can be pushed in the direction parallel with the axis of the probe, as the arrow in FIG. 7 indicates, so as to slide along the slotted hole 133. Again, by pressing the elastic member 140, the jacket 210 disengages from the neck portion 132 of the chamber 130, and gets released from the probe.

Figure 9:
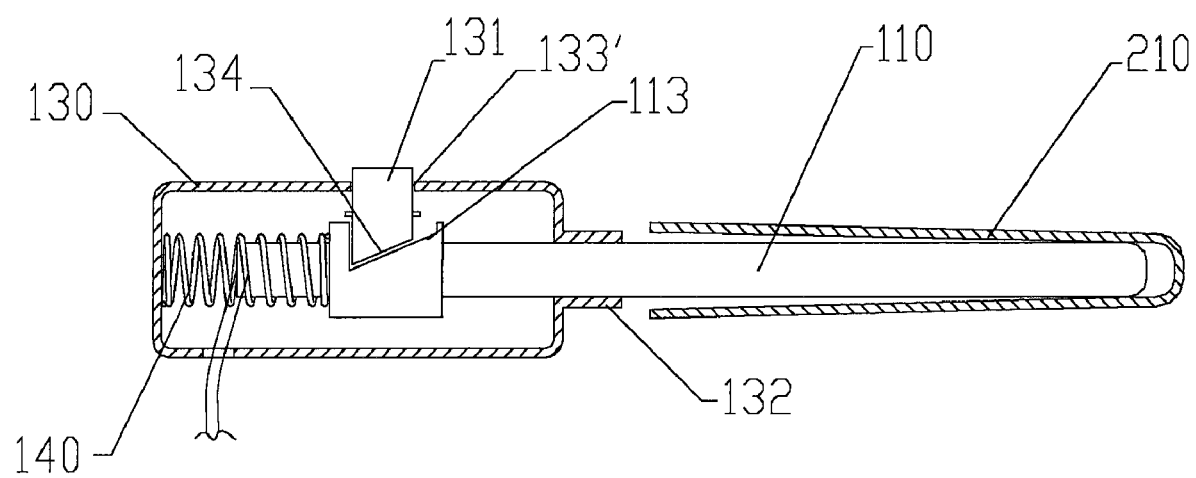
FIG. 9 is a cross-sectional view of the electronic thermometer quick linkage apparatus in accordance with still another embodiment of the present invention.

FIG. 9 shows a thermometer quick linkage apparatus in accordance with still another embodiment of the present invention. The button 131 is provided within the opening 133' alongside the chamber and may move up and down therein. The button 131 is arranged to be perpendicular to the axis of the probe. At the bottom end of the button 131 is arranged an inclined plane 134 that facilitates the push-out of the probe. The inclined plane 134 matches with a corresponding inclined plane 113 arranged at the rear end of the probe having a relatively larger diameter. The inclined plane 113 slants to the pushing direction. The elastic member 140 is provided between the inner wall of the rear end of the chamber 130 and the rear end of the probe 110.

In use, the disposable jacket 210 is inserted onto the probe 110 to engage with the neck portion 132 at the front end of the chamber. At the same time of inserting the jacket 210 onto the probe, the probe 110 and the elastic member 140 are compressed backwards. The inclined plane 113 on the probe 110, against the inclined plane 134 on the button 131, may push the button 131 upwards. If the clench between the jacket 210 and the neck portion 132 at the front end of the chamber is stronger than the elastic restoring force of the elastic member 140, the jacket 210 remains engaged with the probe 110 for body temperature measurement.

When a measurement is completed and the disposable jacket 210 needs to be removed, the button 131 is pressed down, and due to the inclined planes, the pressure applied onto the button is decomposed into a pushing force in the direction along the elastic restoring force of the elastic member 140. When the resultant force of the elastic restoring force and pushing force is great enough to break the bonding between the jacket 210 and the neck portion 132, the disposable jacket 210 can be released from the probe 110, such that the jacket can be replaced conveniently and quickly without contacting the jacket.

The method for replacing a jacket using the thermometer quick linkage apparatus in accordance with an embodiment of the present invention is illustrated as follows:

The probe 110 of the electronic thermometer has its rear end received in the chamber 130, and its front end protruding out of the chamber 130, capable of moving back and forth relative to said chamber 130 within a predetermined distance. The disposable jacket 210 is inserted onto the front end of the probe 110 to let the probe move towards the inside of the chamber, decreasing the distance between the probe and the wall of the rear end of the chamber. The jacket 210 engages with the neck portion 132 at the front end of the chamber to compress the elastic member 140. The button 131 is first pressed down to compress the elastic member 140 to a certain degree the end portion of the button gets in contact with the end portion of the probe, and then is pressed further down to push the probe away from the chamber.

Figure 6:
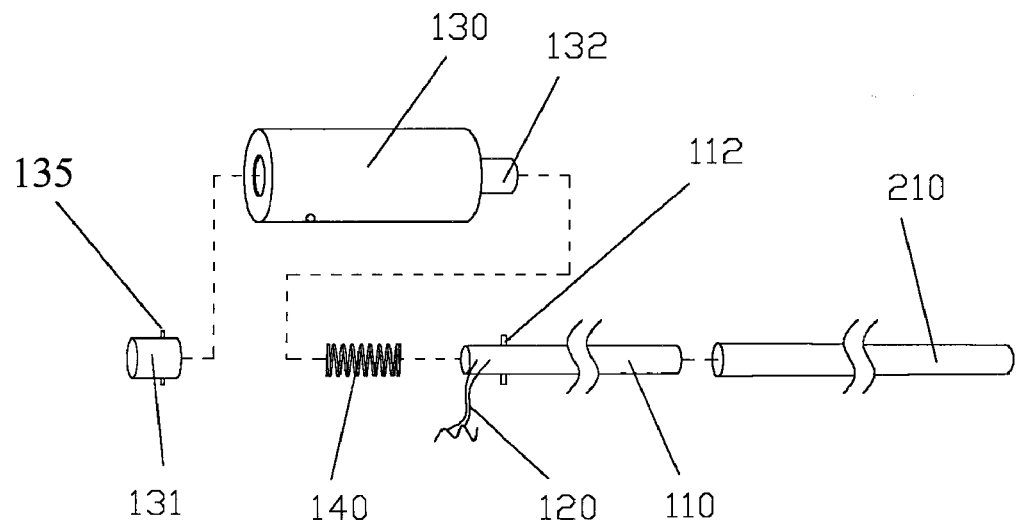
FIG. 6 is an exploded view of the electronic thermometer quick linkage apparatus in accordance with one embodiment of the present invention.

As shown in FIG. 6, the button 131 and the elastic member 140 are arranged to be substantially coaxial with the probe 110. The advantage of such an arrangement is that the structure is simple, and less force is required. As shown in FIGS. 7 and 8, the button 131 may also be provided in parallel with the axial direction of the elastic member 140 and probe 110. In this case, the button 131 delivers pressure to the elastic member 140 through the supporting seat 136 on the button.

A person skilled in the art should understand that modifications or alterations can be made in the light of the above description. For instance, the shape and thickness of the probe may vary, and the elastic member may take other forms. All these modifications and alterations should fall within the protection scope defined by the accompanied claims of the present invention. Besides, the present invention has been described in detail by way of above-mentioned specific preferred embodiments, but the present invention shall by no means be construed to be limited to these embodiments. For a person skilled in the art, simple inference or substitution can be made to the invention without departing from the spirit of the present invention, and should be considered as falling within the protection scope of the present invention.

The invention claimed is:

1. A thermometer quick linkage apparatus, comprising:
an elastic member;
a button having an end provided with an inclined plane;
a probe configured to communicate with a host of the thermometer via a leading wire, the probe having an inclined plane provided at a suitable position on the probe to match with the inclined plane on the button; and
a chamber having a first end provided with an opening for receiving an end portion of the probe, having a second end opposite the first end, and having a side provided with an opening through which a portion of the button is received into an interior of the chamber;
wherein, within the chamber, one end of the elastic member connects with the second end of the chamber, and another end of the elastic member connects with the probe; and
wherein the inclined plane on the button and the inclined plane on the probe are configured such that, when the button is pressed so as to move a greater portion thereof into the interior of the chamber, the inclined plane on the button slides a distance along the inclined plane on the probe so as to push the probe away from the second end of the chamber.

2. The thermometer quick linkage apparatus according to claim 1, wherein the elastic member is a helical spring, one end of which connects with the other end portion of the chamber, and the other end of which is inserted onto the end portion of the probe.

3. The thermometer quick linkage apparatus according to claim 1, wherein a stop member is provided on a portion of the button that is located within the chamber to prevent the button from disengaging from the chamber; and a stop member is also provided on a portion of the probe that is located within the chamber to prevent the probe from disengaging from the chamber, the stop member defining the position of the elastic member.

4. The thermometer quick linkage apparatus according to claim 1, wherein a neck portion is provided on the opening end of the chamber, protruding outwards for receiving the probe, and is dimensioned to have a probe jacket inserted thereon and to mate snugly with the probe jacket.

5. The thermometer quick linkage apparatus according to claim 1, wherein the elastic member encompasses the end portion of the probe, wherein the end portion of the probe is spaced from an inner wall of the chamber so as not to contact the chamber, and wherein the end portion of the probe remains spaced from the inner wall of the chamber so as not to contact the chamber when the button is pressed.

6. The thermometer quick linkage apparatus according to claim 1, wherein the elastic member and the probe are arranged to be substantially coaxial.

* * * * *